(12) United States Patent
Perin et al.

(10) Patent No.: US 9,135,149 B2
(45) Date of Patent: Sep. 15, 2015

(54) TEST CASE ARRANGMENT AND EXECUTION

(75) Inventors: Robert W. Perin, Duvall, WA (US); Garret Blue, Seattle, WA (US)

(73) Assignee: Neopost Technologies, Bagneux (FR)

( * ) Notice: Subject to any disclaimer, the term of this patent is extended or adjusted under 35 U.S.C. 154(b) by 513 days.

(21) Appl. No.: 13/347,947

(22) Filed: Jan. 11, 2012

(65) Prior Publication Data

US 2013/0179734 A1    Jul. 11, 2013

(51) Int. Cl.
*G06F 9/44*    (2006.01)
*G06F 11/36*    (2006.01)

(52) U.S. Cl.
CPC .............. *G06F 11/3688* (2013.01); *G06F 9/44* (2013.01); *G06F 11/3696* (2013.01)

(58) Field of Classification Search
CPC . G06F 11/3672; G06F 11/3688; G06F 11/96; G06F 9/44
See application file for complete search history.

(56) References Cited

U.S. PATENT DOCUMENTS

| | | | |
|---|---|---|---|
| 5,671,351 A * | 9/1997 | Wild et al. | 714/38.13 |
| 6,219,829 B1 * | 4/2001 | Sivakumar et al. | 717/131 |
| 6,725,399 B1 * | 4/2004 | Bowman | 714/38.14 |
| 2004/0148590 A1 | 7/2004 | Lapitski et al. | |
| 2007/0094543 A1 * | 4/2007 | Joshi et al. | 714/38 |
| 2007/0266349 A1 * | 11/2007 | Craig et al. | 716/4 |
| 2008/0163003 A1 * | 7/2008 | Mehrotra | 714/38 |
| 2009/0094575 A1 * | 4/2009 | Vieira et al. | 717/104 |
| 2009/0222697 A1 | 9/2009 | Thakkar et al. | |
| 2009/0316587 A1 * | 12/2009 | Omar | 370/245 |
| 2010/0268992 A1 * | 10/2010 | Evans | 714/37 |

OTHER PUBLICATIONS

Atif M. Memon et al., "Hierarchical GUI Test Case Generation Using Automated Planning", [Online], IEEE 2001, Feb. 2001, pp. 144-155, [Retrieved from Internet on May 2, 2015], <http://ieeexplore.ieee.org/stamp/stamp.jsp?tp=&arnumber=908959>.*

Oliver Niese et al., "Library-Based Design and Consistency Checking of System-Level Industrial Test Cases", [Online], 2001, pp. 233-248, [Retrieved from Internet on May 2, 2015], <http://download-v2.springer.com/static/pdf/114/chp%253A10.1007%252F3-540-45314-8_17.pdf>.*

Matthias Riebisch et al., "UML-Based Statistical Test Case Generation", [Online], 2003, pp. 1-16, [Retrieved from Internet on May 2, 2015], <http://citeseerx.ist.psu.edu/viewdoc/download?doi=10.1.1.71.9692&rep=rep1&type=pdf>.*

Mayan Moudgill et al., "Environment for Power-PC Microarchitecture Exploration", [Online], IEEE1999, pp. 15-25, [Retrieved from Internet on May 2, 2015], <http://ieeexplore.ieee.org/stamp/stamp.jsp?tp=&arnumber=768496>.*

(Continued)

*Primary Examiner* — Thuy Dao
*Assistant Examiner* — Ziaul A Chowdhury
(74) *Attorney, Agent, or Firm* — Morris & Kamlay LLP (57) ABSTRACT

Systems and methods for generating and traversing test cases trees are provided. A test case tree indicates an order of execution for multiple test cases, where setup and tear down or equivalent steps are not required before and after execution of each test case in the tree. The tree may allow for generation of virtual test cases to encompass multiple test cases which ordinarily would have mutually exclusive execution requirements.

14 Claims, 6 Drawing Sheets

(56) References Cited

OTHER PUBLICATIONS

European Patent Office, European Search Report in Application No. 13150390.6-1951, Apr. 9, 2013.

Kung et al., "Developing an Object-Oriented Software Testing and Maintenance Environment", Communications of the ACM, vol. 38, No. 10, pp. 75-87, XP040082834, Oct. 1995.

* cited by examiner

Test Case 1:

FIG. 3

Test Case 2:

Test Case 3:

TEST CASE ARRANGMENT AND EXECUTION

BACKGROUND

Software developers may wish to test various features and situations within a software application to determine whether the application is performing as specified. One technique is to perform manual testing, in which a developer or user causes the application to perform various functions, and observes or reports on the results. Based on those results, the application may be modified to perform differently. Manual testing techniques typically are laborious and relatively time consuming, and may not be effective in identifying every defect or other functionality that may need to be modified. Automated testing techniques, typically referred to as "test automation," are used to automatically perform such testing. Test automation often involves developing other software applications or environments that can automatically execute the software application that is being tested. Automated tests typically may be performed relatively quickly more reliably than manual techniques.

Within test automation, significant time may be spent during setup and tear-down on individual test case runs, i.e., creating the specific situation or state of the software application that is to be tested. Setup often requires elaborate processes to reach a particular execution state that the test case is intended to validate.

BRIEF SUMMARY

The invention provides advantageous methods and systems for developing and executing automated testing using multiple test cases, without requiring conventional setup and tear-down, or cleanup steps before and after execution of each test case.

An embodiment of the disclosed subject matter may include obtaining a tree having a plurality of test case nodes that identify one of a plurality of test cases to be executed by a computer system. The method further includes identifying and executing a first test case, which causes the computer system to be in a first state, and logging a result of the execution. The method continues with identifying a second test case that proceeds from the first state and executing the second test case prior to changing the state of the computer system from the first state. The method concludes with logging a result of executing the second test case.

Another embodiment of the disclosure is a method including receiving a description of a plurality of test cases that may be executed by a computer system in a first state, which, upon execution, cause the computer system to be in a different state. The method further includes identifying a first test case for which the different state is suitable for execution of a second test case, and constructing a test case tree with nodes corresponding to the first and second test cases. Traversal of the tree allows a processor of the computer system to execute each of the first and second test cases without requiring a clean-up step to be performed between each execution.

Additional features, advantages, and embodiments of the invention may be set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the disclosed subject matter, are incorporated in and constitute a part of this specification, illustrate embodiments of the invention and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION

Conventional automation systems may not handle the setup and tear-down required for various test cases efficiently, requiring processing resources to perform setup and tear-down before each test case. For example, many known test automation harnesses, such as Test Director available from Mercury Interactive Corporation and HPSoftware, or the Selenium web application testing system, operate based on a "single test case, single execution code path" principle. That is, each presumes that a developer will construct and test individual test cases, with each test case requiring its own setup and tear-down.

Figure 3:
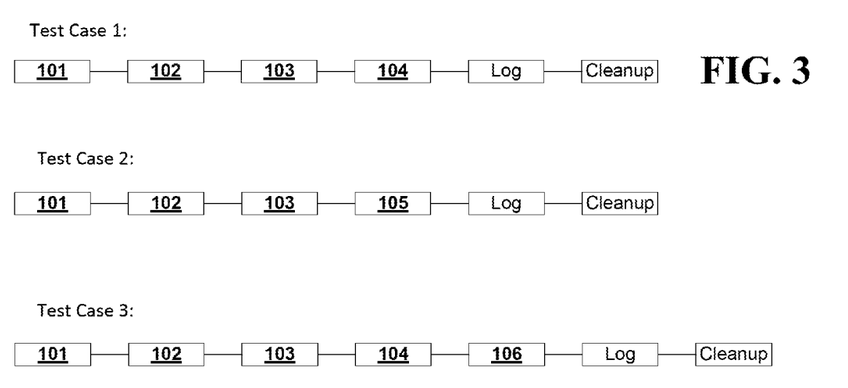
FIG. 3 shows an example execution of three test cases in a software application in a conventional automated testing system.

FIG. 3 shows an example execution of three test cases of a software application in a conventional automated testing system. Each node identifies an operation performable within a software application being tested, such as a button press, menu item selection, icon selection, or the like. In Test Case 1, which validates results of operation or state 104, operations 101, 102, and 103 are performed in order, at the end of which the system is in the state for operation 104 to be performed and tested. Operation 104 is then performed, the results are logged, and any necessary cleanup is performed. Cleanup may be necessary because the performance of a specific operation (such as operation 104 in Test Case 1) may influence, or pollute the state of the preceding operation (such as operation 103 in Test Case 1). Cleanup therefore includes removing any effects of the performance of prior operations, such as to uninstall and reinstall the software application being tested, for example. Next, Test Case 2 is performed. In the example, Test Case 2 is designed to test operation or state 105, which occurs or is possible in the application after operations 101, 102, and 103 have been performed. Hence, Test Case 2 proceeds similarly to Test Case 1, with operation 105 being performed after operation 103 instead of operation 104. The results are logged, and any needed cleanup is performed. In Test Case 3, operation or state 106, which occurs or may be performed after operation 104, is to be tested. Hence, operations 101, 102, 103, and 104 are performed as a prerequisite to the testing of operation 106. The results are again logged and any needed cleanup is performed.

Embodiments of the present invention may reduce the amount of time required to set up and/or run a particular test case or set of test cases. In addition, the test cases may be developed and executed without requiring duplicate code in the prerequisite. This may improve the maintainability and consistency of the test code.

According to an embodiment, multiple test cases may be created and arranged in a tree-like structure, with each node representing a separate test case. State management also may be performed at each node in the tree. Each node may be executed in a depth-first, serialized fashion which may remove or reduce the need for duplicate work, such as the cleanup and duplicative performance of operations necessary to re-establish a state that existed prior to a particular test. In some arrangements, a test case may require an exclusive execution of a given parent node or nodes. In this case, embodiments may provide for the ability to generate a virtual clone of earlier cases in the tree, after which the node may be executed in the normal order. State management may be handled at each node to assure that each appropriate component is present before execution of a particular test case, and to assure that the execution of other test cases has not polluted the test environment in a harmful way.

In an embodiment, each test case may be a structured entity containing relational information (e.g., parent and/or child information) for the tree, a unique identifier (GUID), a method of communicating with the state manager, pre and post execution steps (if needed), a reference to an ancestor from which an exclusive execution path is needed, a timeout value, execution steps, a human readable friendly name, or any combination thereof. When a test case is inserted into the tree, if it includes a reference to an exclusive ancestor reference, then clones of all ancestors between the test case and the identified case may be created and appended to the tree to force exclusive execution for execution of the test case. These may be marked as "volatile," and may be discarded if or when the tree is unloaded.

During an execution phase, the top level node of the tree may be run first. Since it is the first entry into the test case, a state manager may be called to take a snapshot of the current target product. Any tasks that are required to run before the test can be run also may be performed. The test itself then may be run, along with any desired validation. Post-test processes may then be executed. The state manager may be called to verify that the state is still as expected when the test case was entered. For example, the state manager may be called to determine if a state variable contains a value within expected limits, such as confirmation that a text box within which text is required is not empty, or that a required checkbox has been checked, for example. If the state manager indicates a failure, further processing may be halted, and the test case marked as a failure. Otherwise, each child test case of the current test case may be executed in a depth-first recursive fashion. The state manager may be called to validate each test case before each execution.

In an embodiment, each test case may be relatively small, for example only one or two logical operations. As a specific illustrative example, a test case may include generating a click on a button or other action, such as to launch a wizard, select a file, open a directory, or the like. Because the functionality associated with each test case is limited, the system may readily adapt to new changes, such as a new panel in a wizard, a new file dialog, or the like, by inserting a small set of one or more of new cases for the added functionality. In general, test cases that exist further down the tree may need no alteration to account for the changes.

In an embodiment, the state manager may contain state information for each test case in an execution path. This may be useful since the failure of any one test case could pollute the environment and incorrectly influence the results of other test cases, such as those that depend from the failed test case. The failure is attributed to the offending test case, so remaining test cases can then be marked blocked and not run, thus reducing both test execution time and undue failures.

Figure 4A:
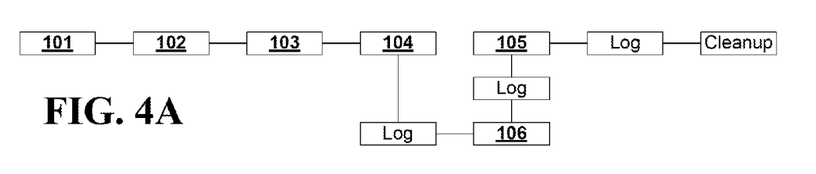
FIGS. 4A-4C show the example test cases shown in FIG. 3, after being integrated into a tree according to an embodiment of the present disclosure.
Figure 4B:
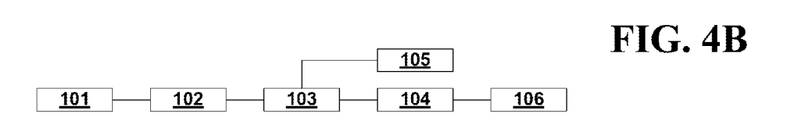
Figure 4C:
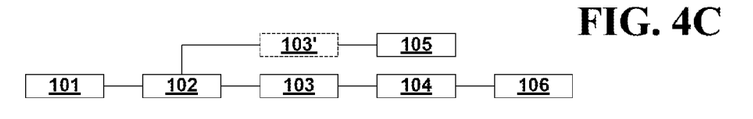

FIGS. 4A-4C show the example test cases shown in FIG. 3, after being integrated into a tree according to an embodiment of the present invention. As shown in FIG. 4A, operations 101, 102, 103, and 104 may be executed as described with respect to FIG. 3. After executing operation 104, the results of performing the test by executing operation 104 may be logged. As previously described, if a test case for operation 104 (also referred to generally as "test case 104") fails or the state manager otherwise indicates a fault, execution may be halted. Otherwise, after execution of the test case 104, the system is in a state suitable for execution of the test case 106, which is then performed and the results logged.

The test system may then return to or otherwise obtain the state needed to perform test case 105. For example, as described herein, a virtual copy of the application state being tested may be made at operation 103. The virtual copy is a duplicate of the state resulting from execution of test case 103, or the state of operation 103. When the system needs to execute test case 105, the virtual copy may be accessed to do so. Thus, any state changes resulting from execution of test case 106 will not impact execution of test case 105. After execution, the virtual state may be discarded and other cleanup performed. Notably, only a single cleanup may be performed after the tree is executed, in contrast to the arrangement shown in FIG. 3 in which multiple setup and cleanup, or tear-down steps are required.

FIG. 4B shows a relational tree illustration of the arrangement shown in FIG. 4A. FIG. 4C shows the same tree with an "exclusive" execution of test case 103, i.e., where execution of operation 103 causes a state change that renders the system unsuitable for execution of both test cases 104 and 105. For example, execution of test case 103 may include deleting or modifying a file that is needed in its original state for execution of one or more subsequent test cases, such as test case 105. As previously described, a virtual copy of the state in which test case 103 is to be executed, node 103', shown by the dashed outline, may be created after execution of test case 102. The virtual copy 103' may then be used to execute test case 105.

Figure 4D:
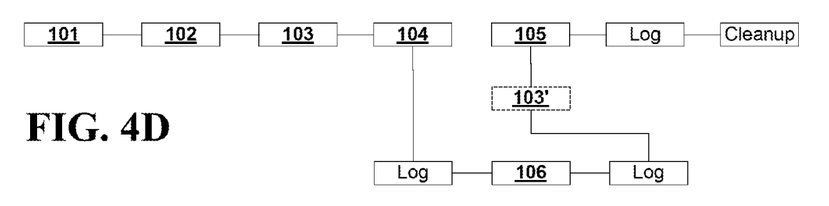
FIG. 4D shows an example execution order for the tree shown in FIG. 4A.

FIG. 4D shows an example execution order for the tree shown in FIG. 4A. As previously described, operations 101, 102, and 103 may be performed followed by test case 104. The results of test case 104 may be logged as previously described, after which test case 106 may be executed and the results logged. A virtual copy of the state of operation 103, 103' may be created and used to execute test case 105. The results of test case 105 may be logged. Once all test cases are complete, the system may perform any needed cleanup.

The virtual copy 103' may be created at any convenient time. For example, where sufficient information is available regarding the relevant states of the system the virtual copy 103' may be created prior to traversal of the tree, such as during construction of the test tree. As another example, the virtual copy 103' may be created once a system such as the test system is in the appropriate state. More generally, embodiments of the disclosed subject matter allow for creation of virtual copies at any time prior to execution a test case that is associated with the virtual copy.

Figure 5A:
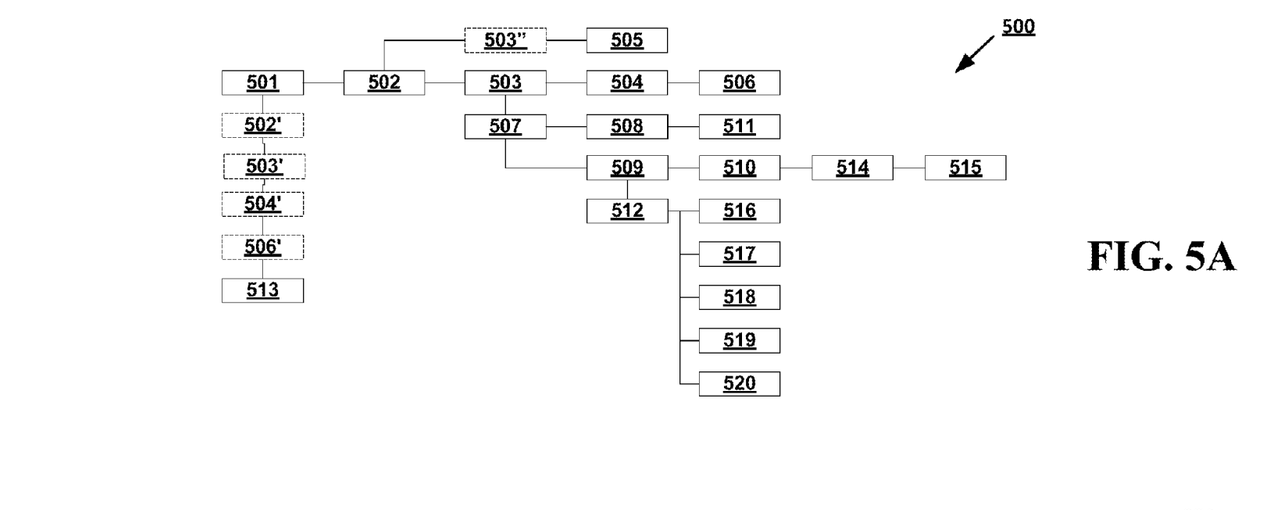
FIG. 5A shows an example test case tree according to an embodiment of the disclosure.
Figure 5B:
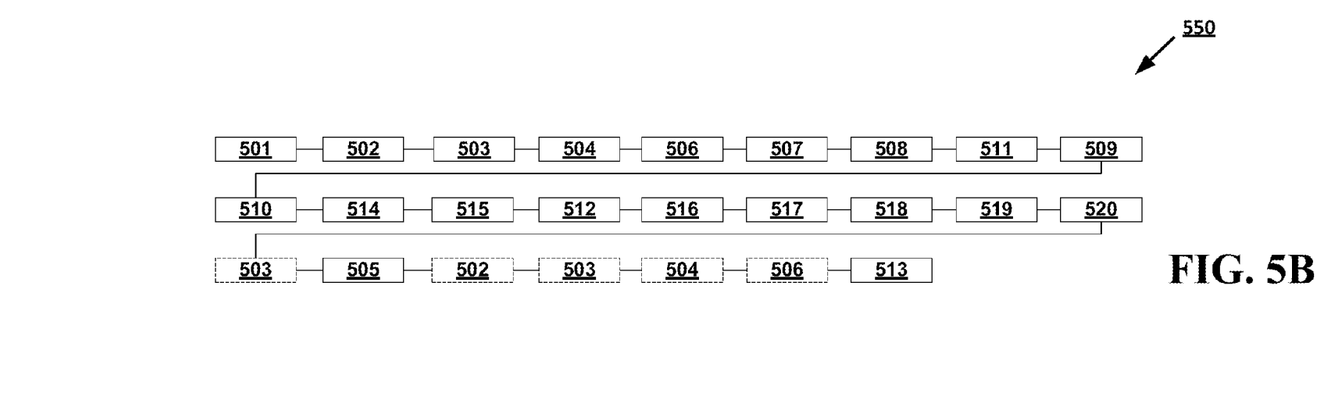
FIG. 5B shows an example execution order for the tree shown in FIG. 5A.

It will be understood that the simple tree shown in FIGS. 4A-4D is illustrative only, and that in general any number of test cases may be incorporated into a tree. FIG. 5A shows an example test case tree 500 according to an embodiment of the invention. FIG. 5B shows an example execution order 550 for the tree 500 shown in FIG. 5A. As previously described, the tree 500 may be traversed and each test case executed using, for example, a depth-first recursion of the tree 500. An example procedure used to traverse the tree 500 is provided below. Generally any technique that reaches each test case in the tree that is to be executed may be used.

An example procedure to traverse the tree may include the following actions:

1. Test case 501 is run as it's the first node in the tree.
2. It is determined that test case 501 has a child, test case 502, so test case 502 is run.
3. Test case 502 has two children, 503 and 507. One child test case is selected and executed. In this example, test case 503 is selected; more generally, any child test case may be selected first.
4. Test case 503 is run. Test case 503 has two children. As with test case 502, one child test case (504 in the example) is selected and run.
5. Test case 506 is run. It has no children, so test case 507 is selected as the nearest child of the nearest ancestor that has not yet been executed (test case 503 in the example).
6. Test case 507 is run. It has 2 children, so the first, test case 508 in the example, is selected.
7. Test case 508 is run.
8. Test case 508 has 1 child, test case 511, so 511 is run.
9. Test case 511 has no children. As previously described, the nearest child of the nearest ancestor that has not yet been executed is selected. In the example, this is test case 509.
10. Test case 509 is run. It has two children, so the first, test case 510, is selected.
11. Test case 510 is run. It has a single child, test case 514, which is selected.
12. Test case 514 is run. It has a single child, test case 515, which is selected and run.
13. Test case 515 has no children, so the nearest child of the nearest ancestor that has not yet been executed is selected and run. In the example, this is test case 512.
14. Test case 512 has 5 children, so the first, test case 516, is selected and run.
15. Test case 516 has no children, so the nearest child of the nearest ancestor that has not yet been executed, test case 517, is selected and run.
16. Similarly, each of test cases 517, 518, and 519, has no children. For each, the test case is run and then the nearest child of the nearest ancestor that has not yet been executed is selected and run (test cases 518, 519, and 520, respectively).
17. Test case 520 has no children, so the nearest child of the nearest ancestor that has not yet been executed is selected. In the example, this corresponds to virtual node 503", which is shown with a dashed outline to indicate it is a "virtual" node as previously described. That is, node 503" is a replica of the state at node 503, following execution of operation 502, to allow for test cases that require exclusive execution due to, for example, a change in state that renders the system unsuitable for subsequent test cases.
18. Node 503" has a child 505, so test case 505 is run.
19. Node 505 has no children, so the nearest child of the nearest ancestor that has not yet been executed, 502', so is run.
20. Test case 502' has a child 503', so 503' is run.
21. Similarly, 503', 504', 506', and 513' are run in turn.
22. After execution of test case 513' there are no unexecuted nodes remaining, so the system exits the tree and performed any needed cleanup.

As previously described, after execution of each test case shown in FIG. 5A, the results of the test case may be logged. If any test case indicates a failure, the system may exit the node and perform cleanup without executing subsequent nodes if the failed test case may affect execution of subsequent test cases.

Figure 6:
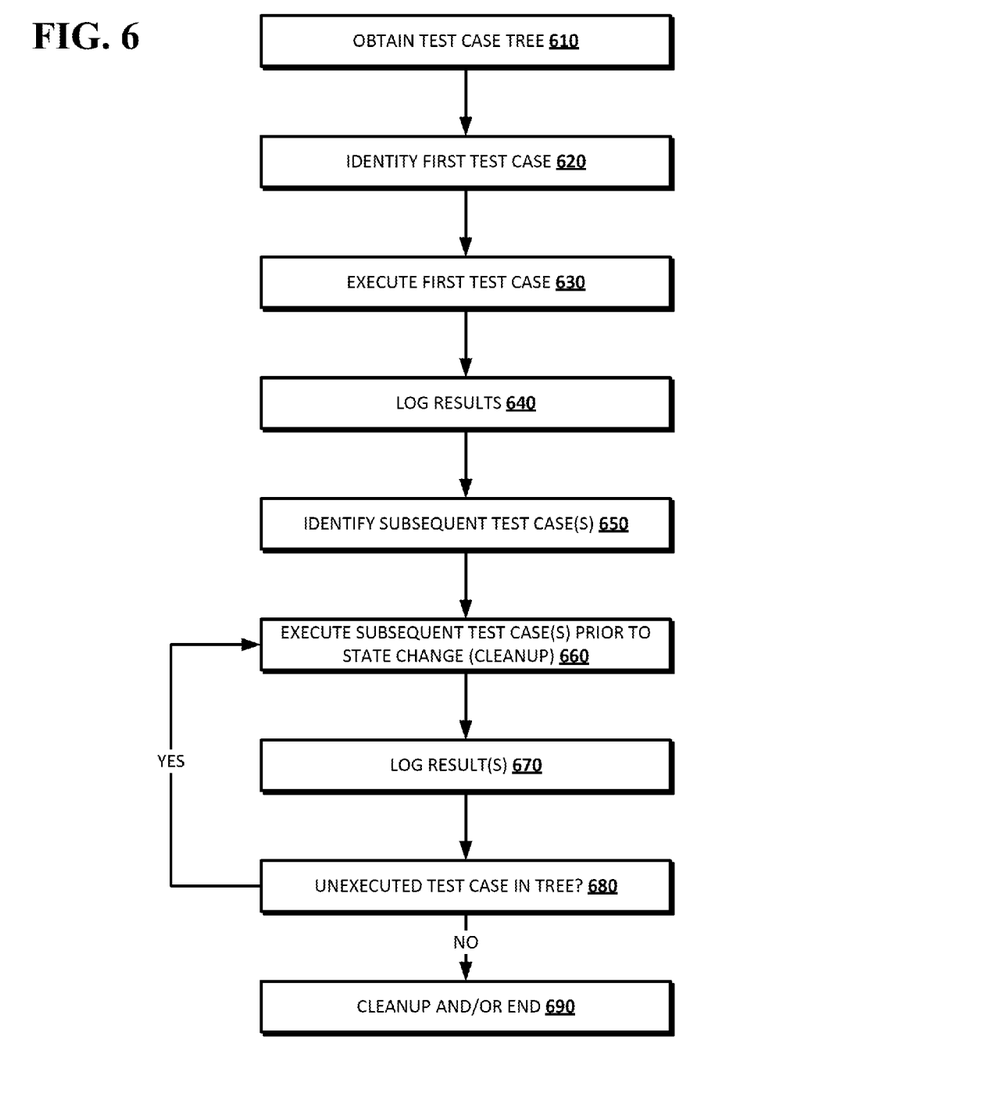
FIG. 6 shows an example process for executing a test case tree according to an embodiment of the disclosure.

FIG. 6 shows an example process for executing test cases according to an embodiment. FIG. 6 may be used, for example, in conjunction with the example test case trees previously described. At 610, a test case tree may be obtained. The test case tree may include multiple test case nodes, each of which identifies a test case to be executed. At 620, a first test case to be executed may be identified. The first test case may be, for example, a node in the tree that does not have a parent node. As another example, where an error or other result caused a test case in the test case tree to be halted and/or traversal of the test case tree to halt previously, the first test case selected may be the test case that caused traversal to halt. This may be the case where an error associated with the test case node which caused the halt has been corrected and the test case is to be re-run, but the error does not affect other nodes in the tree.

At 630 the first test case may be run, and the results may be logged at 640. When the first test case is run, it may place the system being tested into a state associated with completion of the first test case, which may be suitable for further test cases to be executed. At 650, one or more subsequent test cases may be identified in the tree, such as those associated with child nodes of the first test case node. A subsequent test case may be executed at 660 and the results logged at 670. The subsequent test case may be run without changing the state of the system being tested, for example, without performing any clean-up steps typically associated with a conventional test case. At 680, the test system may determine whether there is an unexecuted test case represented in the tree and, if so, return to step 650 or 660 to identify and/or execute the unexecuted test case. As previously described, steps 650-680 may be performed repeatedly to traverse the entire tree, such as by using a depth-first traversal technique. When there are no unexecuted test cases represented in the tree, traversal of the tree and execution of test cases may end at 690. If any cleanup is required, it may be performed at 690, after execution of all test cases in the tree.

Figure 7:
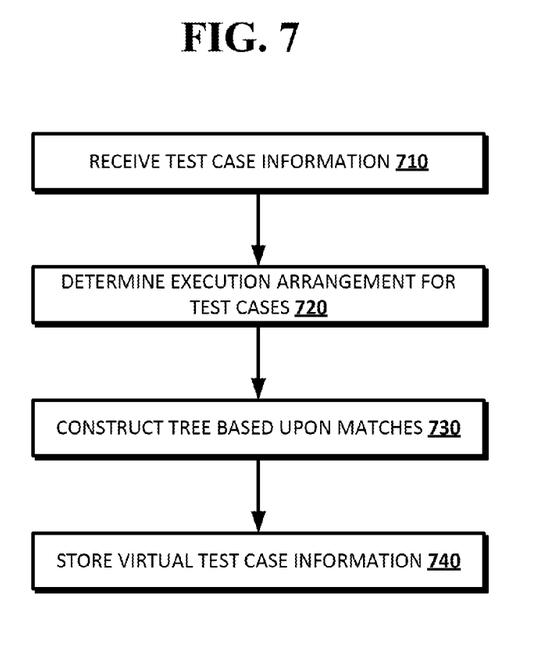
FIG. 7 shows an example process for generating a test case tree according to an embodiment of the disclosure.

FIG. 7 shows an example process for constructing a test case tree according to an embodiment, such as for constructing the test case trees illustrated in FIGS. 4 and 5. At 710, a computer system may receive information about test cases to be included in the tree. The information may include, for example, a description of the start and end state of a test system before and after execution of the test case, an indication of which test cases may be executed before or after other test cases, an explicit execution order of one or more of the test cases, or any other relevant information.

At 720 an execution arrangement for the test cases may be determined and/or constructed. For example, the system may match start and end states of the test cases, such that a test case which may be executed from a state resulting from execution of another test case is placed into the test case tree as a child of the other test case. Similarly, those test cases requiring exclusive execution relative to other test cases may be identified, and the test cases placed into the tree appropriately as previously described. As another example, those points in the tree where a virtual test case should be created may be noted, and/or various data for generating the virtual test case may be stored with the tree. The test case tree may be arranged such that traversal of the tree by a processor allows the processor to execute each of the test cases without requiring a clean-up or equivalent step to be performed between each execution.

Figure 1:
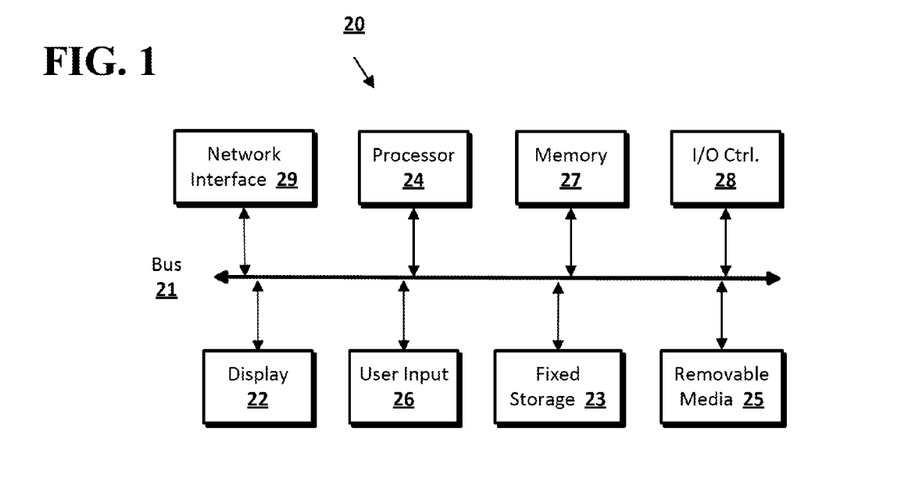
FIG. 1 shows a network configuration according to an embodiment of the disclosed subject matter.

Embodiments of the invention may be implemented in and used with a variety of component and network architectures. FIG. 1 is an example computer 20 suitable for implementing embodiments of the invention. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
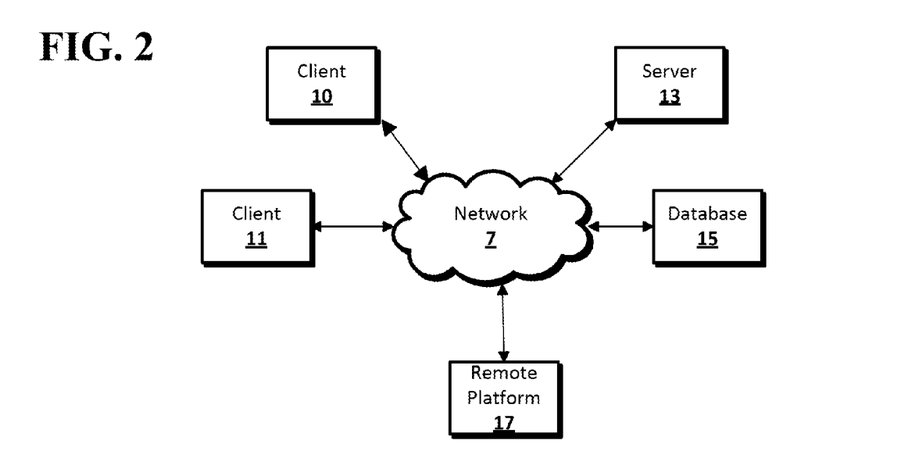
FIG. 2 shows a computer system according to an embodiment of the disclosed subject matter.

FIG. 2 shows an example network arrangement according to an embodiment. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the invention. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to various embodiments in hardware and/or firmware. The processor may be coupled to memory, such as RAM, ROM, flash memory, a hard disk or any other device capable of storing electronic information. The memory may store instructions adapted to be executed by the processor to perform the techniques disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A computer-implemented method comprising:
obtaining, by a computer system, a tree comprising a plurality of test case nodes, each of the plurality of test case nodes identifying one of a plurality of test cases to be executed by the computer system;
identifying a first test case of the plurality of test cases;
executing the first test case, the first test case causing the computer system to be in a first state upon completion of the first test case;
logging a result of the execution of the first test case;
identifying a second test case of the plurality of test cases, the second test case beginning from the first state;
prior to changing the state of the computer system from the first state, executing the second test case, the second test case causing the computer system to be in a second state upon completion of the second test case;
identifying a third test case of the plurality of test cases, the third test case beginning from the first state and not being executable from the second state;
accessing a virtual copy equivalent to the first test case, the virtual copy being generated prior to execution of the second test case and generating the state of the virtual copy prior to obtaining the tree comprising the plurality of test case nodes;
executing the third test case from the virtual copy; and
logging a result of the execution of the third test case.

2. A method according to claim 1, further comprising:
identifying a third test case of the plurality of test cases, the third test case beginning from the second state;
prior to changing the state of the computer system, executing the third test case, the third test case causing the computer system to be in a third state upon completion of the third test case; and
logging a result of the execution of the third test case.

3. A method according to claim 1, wherein at least one of the plurality of test cases executes from the same state as at least one other of the plurality of test cases, and places the computer system into a different state than the at least one other of the plurality of test cases after execution.

4. A method according to claim 1, wherein at least one of the plurality of test case nodes is a virtual node.

5. A computer-implemented method comprising:
receiving, by a computer system, a description of a plurality of test cases, each test case being executable when the computer system is in a first state and causing the computer system to be in a state different from the first state, upon execution;
identifying, by a processor, a first test case of the plurality of test cases for which the different state is suitable for execution of a second test case of the plurality of test cases;
identifying a third test case of the plurality of test cases for which the different state is suitable for execution of the third test case;
generating a virtual test case corresponding to the different state and generating a state of the virtual test case prior to obtaining a test case tree; and
constructing a test case tree comprising nodes corresponding to the first test case, the second test case, and the third test case, wherein traversal of the tree by a processor allows the processor to execute each of the first and second test cases without requiring a clean-up step to be performed between each execution.

6. A method according to claim 5, further comprising storing information with the test case tree indicating when one or more virtual test cases should be generated during traversal of the tree by a processor.

7. A method according to claim 5, further comprising storing information for one or more nodes in the test case tree indicating the hierarchical position of the one or more nodes within the test case tree.

8. A method according to claim 5, wherein the first state for each of the plurality of test cases is different from the first state for each other of the plurality of test cases.

9. A system comprising:
a computer-readable medium storing a tree comprising a plurality of test case nodes, each of the plurality of test case nodes identifying one of a plurality of test cases to be executed by the computer system;
a processor configured to:
obtain the tree;
identify a first test case of the plurality of test cases;
execute the first test case, the first test case causing the computer system to be in a first state upon completion of the first test case;
log a result of the execution of the first test case;
identify a second test case of the plurality of test cases, the second test case beginning from the first state;
prior to changing the state of the computer system from the first state, execute the second test case, the second test case causing the computer system to be in a second state upon completion of the second test case;
identify a third test case of the plurality of test cases, the third test case beginning from the first state and not being executable from the second state;
access a virtual copy equivalent to the first test case, the virtual copy being generated prior to execution of the second test case and generate a state of the virtual copy prior to obtaining the tree comprising the plurality of test case nodes;
execute the third test case from the virtual copy; and
log a result of the execution of the third test case.

10. A system according to claim 9, said processor further configured to:
identify a third test case of the plurality of test cases, the third test case beginning from the second state;
prior to changing the state of the computer system, execute the third test case, the third test case causing the computer system to be in a third state upon completion of the third test case; and
log a result of the execution of the third test case.

11. A system according to claim 9, wherein at least one of the plurality of test cases executes from the same state as at least one other of the plurality of test cases, and places the computer system into a different state than the at least one other of the plurality of test cases after execution.

12. A system according to claim 9, wherein at least one of the plurality of test case nodes is a virtual node.

13. A system comprising:
a processor configured to:
receive a description of a plurality of test cases, each test case being executable when the computer system is in a first state and causing the computer system to be in a state different from the first state, upon execution;
identify a first test case of the plurality of test cases for which the different state is suitable for execution of a second test case of the plurality of test cases;
identify a third test case of the plurality of test cases for which the different state is suitable for execution of the third test case;
generate a virtual test case corresponding to the different state and generate a state of the virtual test case prior to obtaining a test case tree; and construct a test case tree comprising nodes corresponding to the first test case, the second test case, and the third test case, wherein traversal of the tree by a processor allows the processor to execute each of the first and second test cases without requiring a clean-up step to be performed between each execution.

14. A system according to claim 13, wherein the first state for each of the plurality of test cases is different from the first state for each other of the plurality of test cases.

\* \* \* \* \*